May 11, 1937. A. VAN W. PALTHE 2,080,332
WHEELBARROW
Filed Dec. 16, 1935
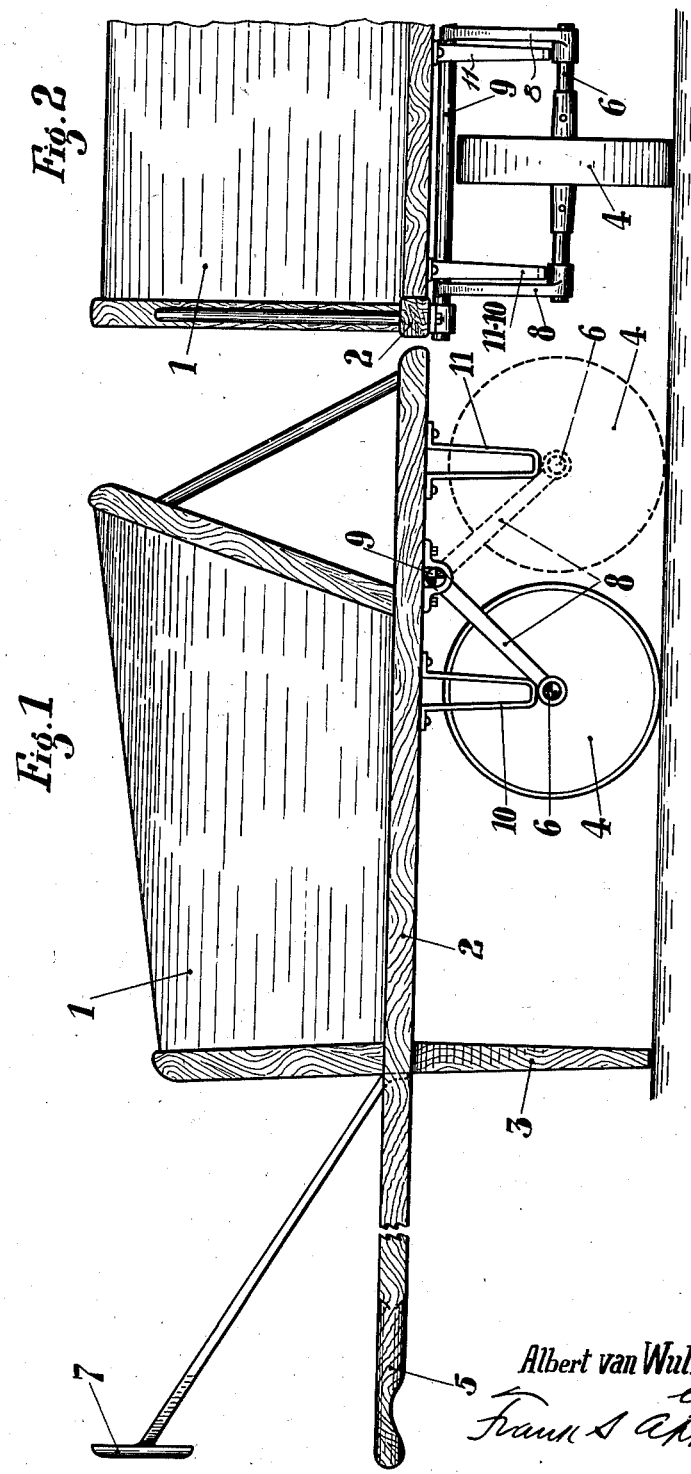
Inventor:
Albert van Wulfften Palthe,
Attorney:

Patented May 11, 1937

2,080,332

UNITED STATES PATENT OFFICE 2,080,332

WHEELBARROW

Albert van Wulfften Palthe, Uccle, Belgium

Application December 16, 1935, Serial No. 54,716
In Belgium November 20, 1935

2 Claims. (Cl. 280—52)

In ordinary wheel barrows, the directing wheel which constitutes the pivot of the lever formed by the whole barrow is disposed at one end of the barrow frame, the arms which serve to push the barrow being disposed at the other end. The whole is thus a lever in which the point at which the resistance acts (i. e. the load) is located between the pivoting point (i. e. the wheel) and the point where the effort is applied (i. e. the arms).

It has already been proposed to displace the pivoting point so as to near it to—and at the limit to make it coincide with—the point at which the resistance acts.

In that case, the directing wheel is located under the box of the wheel barrow. Such a wheel barrow is easier to handle than an ordinary wheel barrow, in that the force to be applied to lift the arms is much smaller and decreases progressively as the axis of the directing wheel near the vertical which passes through the center of gravity of the load (with reduction and even nearly complete suppression of resisting arm).

The force to be applied is therefore nearly limited to the force necessary for progress of the barrow and to facilitate handling there is even provided in front of the barrow, that is to say between the arms or handle, one or several pushing devices ending at the level of the breast of the conductor, in such a manner that he pushes mainly with his chest, the arm serving only to substantially keep the barrow (load) lifted and to guide the barrow.

This wheel arrangement, in which the wheel is located under the box of the barrow with provision of an auxiliary pushing device is highly interesting when progressing on hard practically level ground. In that case, a substantially lesser force allows to displace loads considerably heavier than with ordinary wheel barrows. However, when progressing on soft ground, soaked soil or when climbing a relatively steep slope, this arrangement cannot be applied and use must then be made of an ordinary wheel barrow.

This invention has for an object to provide a wheel barrow comprising in combination the two known devices and which therefore allows it to move on soft soil or on a steep slope exactly as with an ordinary wheel barrow, and furthermore, which allows if the ground is hard, to progress with the aid of a considerably reduced effort, thanks to an artificially obtained reduction of the resisting arm comprising the barrow.

According to this invention this object is attained by mounting the axle of the wheel displaceable parallelly to itself, in various positions in respect to the box or frame of the barrow, and particularly, in such a manner that in an extreme position, the axle of the wheel is nearly in the vertical which passes through the center of gravity of the load, whilst in the other extreme position the axle of the wheel is considerably displaced in respect to said vertical which thus passes between the point at which the lever pivots and the point at which the force acts.

The arrangement can be such as to limit the positioning of the axle of the wheel to those two extreme positions or so as to allow a series of intermediate positions.

A very simple way of carrying the invention into effect is to mount the shaft of the wheel at the lower end of an arm, the other end of which is pivotally related to the chassis of the barrow. Two stops fixed to this chassis, one on each side and symmetrically in respect to the pivot of this arm, act to limit the displacement of the arm and the shaft of the wheel.

In a modified form the shaft of the wheel is mounted in a horizontal slot formed in a longitudinal member fixed to the lower part of the barrow chassis.

The shaft is displaceable on said slot and means, easy to conceive are provided to maintain said shaft in any prescribed position in said slot.

Figure 1 is a view in side elevation of a wheelbarrow embodying the invention and Figure 2 is a rear end view thereof.

1 is the box or receptacle of a wheel barrow mounted on or pertaining to a chassis 2 carried at one end by legs 3 and towards the other end or at another point by the directing wheel 4.

This chassis comprises two arms 5 which serve to apply the uplifting force or effort of the wheel barrow round the shaft 6 of the wheel, one or several parts such as 7 being preferably provided between arms 5, these known parts ending up at the level of the chest of the barrow-man to allow him to exert by means of his chest the main effort in view of progressing with the barrow. Those parts 7 can be of any type, fixed or adjustable.

The shaft 6 of the wheel is rotatably mounted at the lower end of an arm 8, the other end of which is pivoted at 9 under the chassis 2. The chassis carries two rigid stops 10 and 11, symmetrically located, one on each side of pivot 9 and against which the arm 8 abuts in one or the other of its extreme positions. In the position shown in full lines the shaft of the wheel is located under the box 1 and near to the vertical which passes through the center of gravity of the load when the barrow is lifted up in view of displacement. The necessary effort to support the load is thus very feeble.

If the soil or ground is soft or if a relatively steep slope must be climbed, this position is not suitable any more and it is then sufficient to bring arm 8 in the position shown in dotted lines, which corresponds to that of an ordinary barrow.

It will be understood that arm 8 may be double so as to support shaft at its two ends.

Also, the invention is not limited to the preferred form shown. A series of other equivalent realizations may be conceived, allowing to alter the position of shaft 6 in respect to the load. Thus two supports may be provided, each one corresponding to one of the positions shown. In this case it would naturally be necessary to remove and reset shaft 6.

A slide parallel to chassis 2 could also be provided, in which shaft 6 could be inserted and maintained in various positions.

All those forms of realization and others which are only mechanical equivalents of the preferred form shown are included in the scope of the invention as set forth in the appended claims.

Having now fully described my said invention, what I claim and desire to secure by Letters Patent, is:

1. In a wheel barrow, a frame including longitudinal members, a pair of arms pivoted to the under sides of said members, an axle carried by the free ends of said arms, a wheel carried by the axle, and a pair of stop members spaced equally on the under side of the frame forwardly and rearwardly from the pivot point of said arms and having their lower ends in the path of the free end of one of said arms whereby the wheel may be positioned selectively in front and rear positions.

2. In a wheel barrow, a frame including longitudinal members, a pair of arms pivoted to the under sides of said members, an axle carried by the free ends of said arms, a wheel carried by the axle, and a pair of stop members spaced equally on the under side of the frame forwardly and rearwardly from the pivot point of said arms and having their lower ends in the path of the free end of one of said arms whereby the wheel may be positioned selectively in front and rear positions; each of said stop members consisting of a U-shaped strap having out-turned feet on its legs for attachment to said frame, said stop members being of equal length whereby the wheel is equally spaced from the frame in each operative position.

ALBERT van WULFFTEN PALTHE.